United States Patent
Heap et al.

(10) Patent No.: US 12,470,760 B2
(45) Date of Patent: Nov. 11, 2025

(54) SYSTEMS AND METHODS FOR MULTICAST AD SERVING

(71) Applicant: Imagine Communications Corp., Plano, TX (US)

(72) Inventors: Graham Andrew Heap, Godalming (GB); Emma Quinn, Guildford (GB); Robert David Malcolm, Elgin (GB); Thomas Huxter-Freer, Kingston upon Thames (GB)

(73) Assignee: Imagine Communications Corp., Plano, TX (US)

( * ) Notice: Subject to any disclaimer, the term of this patent is extended or adjusted under 35 U.S.C. 154(b) by 0 days.

(21) Appl. No.: 18/889,302

(22) Filed: Sep. 18, 2024

(65) Prior Publication Data

US 2025/0324121 A1 Oct. 16, 2025

Related U.S. Application Data

(60) Provisional application No. 63/633,454, filed on Apr. 12, 2024.

(51) Int. Cl.
*H04N 21/234* (2011.01)
*H04N 21/262* (2011.01)
(Continued)

(52) U.S. Cl.
CPC . *H04N 21/26233* (2013.01); *H04N 21/23424* (2013.01); *H04N 21/266* (2013.01); *H04N 21/812* (2013.01)

(58) Field of Classification Search
CPC .............................. H04N 21/23424
See application file for complete search history.

(56) References Cited

U.S. PATENT DOCUMENTS

| 2016/0182923 | A1 | 6/2016 | Higgs et al. |
| 2018/0343495 | A1* | 11/2018 | Loheide ............... H04N 21/435 |
| 2021/0337254 | A1 | 10/2021 | Lykes et al. |

OTHER PUBLICATIONS

European Patent Office, Communication, Extended European Search Report issued for European Patent Application No. 25170450.8, dated Sep. 10, 2025, 9 pages.

(Continued)

*Primary Examiner* — Michael H Hong
(74) *Attorney, Agent, or Firm* — Norton Rose Fulbright US LLP

(57) ABSTRACT

Systems and methods for serving advertisement in a video stream are disclosed. An example method includes: obtaining one or more advertisement (ad) orders; generating, by a traffic engine, a first temporal schedule indicating a start time and an end time for a video stream and one or more timing references, each of the timing references indicating a respective position in the video stream for advertisement placement; generating, by a playout engine, a broadcast manifest based on the first temporal schedule; processing, using a multicast video processing unit, the video stream using a video encoder to generate a transport stream based on the video stream, the transport stream comprising one or more data markers for placements of one or more advertisements; modifying the broadcast manifest based on one or more optimization criteria; and generating a video output feed using the transport stream and the broadcast manifest.

20 Claims, 4 Drawing Sheets

(51) Int. Cl.
*H04N 21/266* (2011.01)
*H04N 21/81* (2011.01)

(56) References Cited

OTHER PUBLICATIONS

International Telecommunication Union, ITU-T, Series J: Cable Networks and Transmission of Television, Sound Programme and Other Multimedia Signals—Digital transmission of television signals—Part 1; Digital Program Insertion Cueing Message for Cable—Amendment 1: Recommended Practice for ITU-T J.181, Sep. 2014, 70 pages.

DASH Industry Forum, "Guidelines for Implementation: Ad Insertion in DASH," Version 0.9, 3rd Generation Partnership Project (3GPP); Retrieved from the Internet: http://www.3gpp.org/ftp/tsg_sa/WG4_COD EC/TSGS4_82/Docs/; Sep. 2014, 31 pages.

* cited by examiner

SYSTEMS AND METHODS FOR MULTICAST AD SERVING

CROSS-REFERENCE

This application claims priority to U.S. Provisional Patent Application No. 63/633,454 titled SYSTEMS AND METHODS FOR MULTICAST AD SERVING filed on Apr. 12, 2024.

FIELD

Embodiments generally relate to the field of advertisement delivery with video streaming services. More specifically, embodiments relate to systems and methods for optimizing advertisement placement and delivery in a multicast video stream.

INTRODUCTION

As premium video consumption moves from traditional broadcast delivery infrastructures, which include for example, delivery via air, satellite, or cable infrastructures to televisions, to real time, dynamic consumption of streamed video content by users using various devices over the internet in real time, advertisements ("ad" or "ads") displayed in such dynamic delivery of video content have become less efficient and less effective when delivered using a standard approach.

An example advertisement technology is Server Side Ad-Insertion (SSAI), which is a process used to insert ads into a single digital video stream, where the server stitches an ad directly into the video content. Where advertisers desire broad reach spots hitting large geographical regions, or even the entire audience, the same decisions of ads are usually made (and charged for) multiple times, which can be costly for the advertisers.

SUMMARY

In one aspect, a computer-processor-implemented advertisement processing and delivery system is provided, comprising: a processor; a non-transitory data storage device storing a set of instructions, when executed by the processor, causes the system to: obtain, by a traffic engine, one or more advertisement (ad) orders; generate, by the traffic engine, a first temporal schedule indicating a start time and an end time for a video stream and one or more timing references, each of the timing references indicating a respective position in the video stream for advertisement placement; generate, by a playout engine, a broadcast manifest based on the first temporal schedule; process, using a multicast video processing unit, the video stream using a video encoder to generate a transport stream based on the video stream, the transport stream comprising one or more data markers for placements of one or more advertisements; modify the broadcast manifest based on one or more optimization criteria; and generate a video output feed using the transport stream and the broadcast manifest.

In some embodiments, the one or more data markers comprise Digital Program Insertion Cueing Message for Cable (SCTE) 35 markers.

In some embodiments, in response to the one or more data markers, the broadcast manifest is updated to include one or more advertisement placements within the video output feed.

In some embodiments, the system includes a multicast manifest manipulation unit to update the broadcast manifest.

In some embodiments, the system includes a unicast manifest manipulation unit to update the broadcast manifest.

In some embodiments, the system includes the broadcast manifest is associated with the temporal schedule.

In some embodiments, the multicast manifest manipulation unit is configured to populate the transport stream with one or more advertisements based on the temporal schedule.

In some embodiments, the multicast manifest manipulation unit is configured to populate the transport stream with one or more advertisements optimized by an optimization engine.

In some embodiments, the optimization engine is configured to optimize one or more placements of the one or more advertisements based on the broadcast manifest. The one or more advertisements comprise one or more linear control advertisements.

In yet another aspect, a computer-process-implemented method for serving advertisement in a video stream is provided, the method comprising: obtaining, by a traffic engine, one or more advertisement (ad) orders; generating, by the traffic engine, a first temporal schedule indicating a start time and an end time for a video stream and one or more timing references, each of the timing references indicating a respective position in the video stream for advertisement placement; generating, by a playout engine, a broadcast manifest based on the first temporal schedule; processing, using a multicast video processing unit, the video stream using a video encoder to generate a transport stream based on the video stream, the transport stream comprising one or more data markers for placements of one or more advertisements; modifying the broadcast manifest based on one or more optimization criteria; and generating a video output feed using the transport stream and the broadcast manifest.

In some embodiments, the one or more data markers comprise Digital Program Insertion Cueing Message for Cable (SCTE) 35 markers.

In some embodiments, in response to the one or more data markers, the method includes updating the broadcast manifest to include one or more advertisement placements within the video output feed.

In some embodiments, the method includes using a multicast manifest manipulation unit to update the broadcast manifest.

In some embodiments, the method includes using a unicast manifest manipulation unit to update the broadcast manifest.

In some embodiments, the broadcast manifest is associated with the temporal schedule.

In some embodiments, the multicast manifest manipulation unit is configured to populate the transport stream with one or more advertisements based on the temporal schedule.

In some embodiments, the multicast manifest manipulation unit is configured to populate the transport stream with one or more advertisements optimized by an optimization engine.

In some embodiments, the optimization engine is configured to optimize one or more placements of the one or more advertisements based on the broadcast manifest. The one or more advertisements may include one or more linear control advertisements.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

BRIEF DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
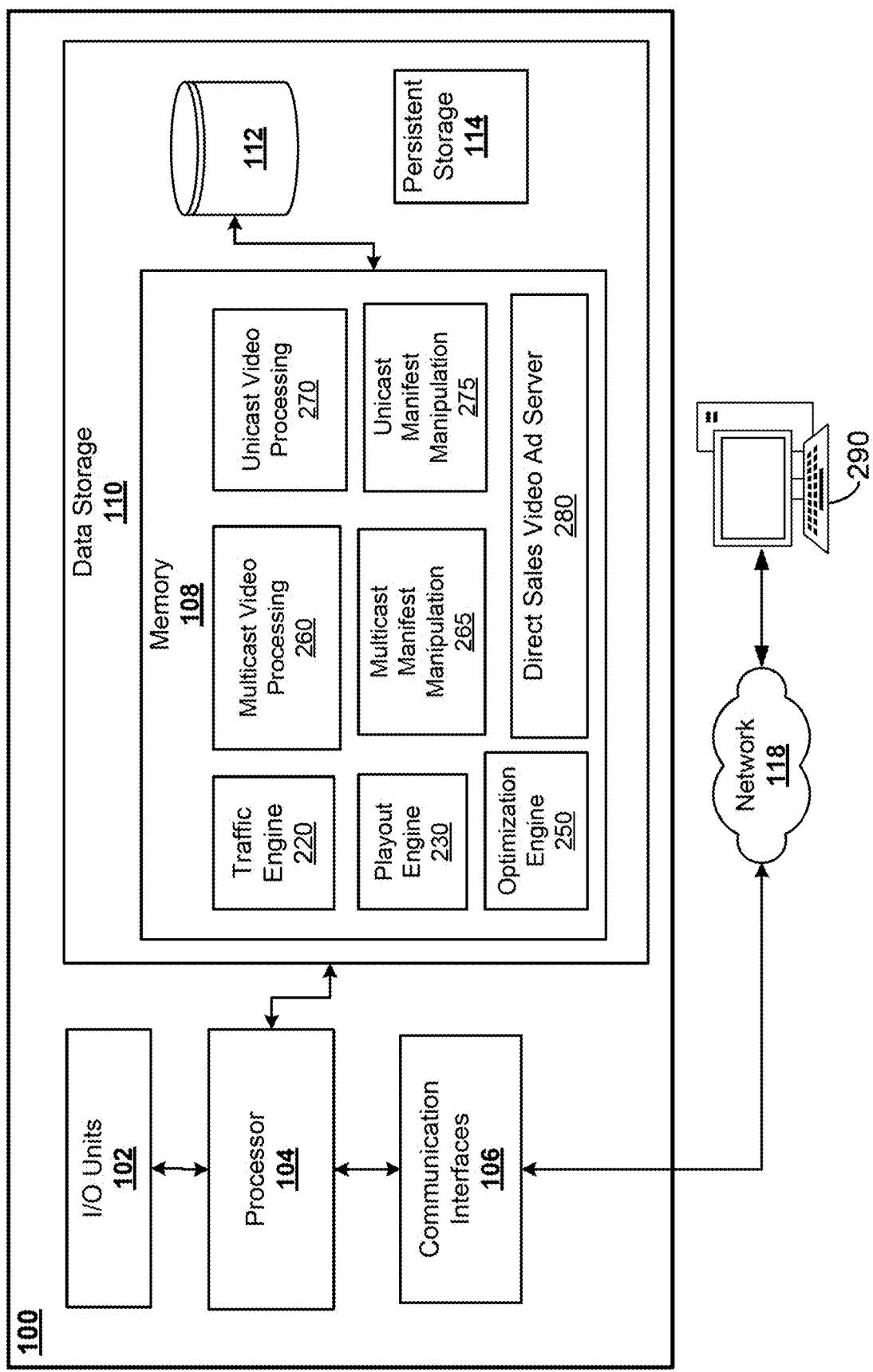
FIG. 1 is a block diagram of an example video ad processing system in accordance with one embodiment.

Throughout the following discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

Throughout the disclosure, the term "video" may be used to describe moving pictures, associated audio and accompanying metadata. That is, a video may be inclusive of video data, audio data, metadata, and/or any other embedded data.

Over-the-top (OTT) video or media content delivery generally refers to delivery of content to audiences via the internet, bypassing cable, broadcast, and satellite. OTT is colloquially known as streaming TV. Audiences or viewers can enjoy media content via OTT using a number of devices, such as mobile devices, gaming consoles, tablets, computers, or connected TVs (CTVs). Connected TV, or CTV, is a device that is used to deliver streaming video content over the internet, which may include, for example, smart TVs, gaming consoles, digital media players, or other types of devices.

In an OTT environment, or other broadcast landscape where advertisements are inserted into video streams for delivery, utilising a combination of a manifest manipulator and an advertisement server to splice in ads where the intent is for multiple people to see the same advertisement is an expensive proposition, as each individual ad decision incurs a cost to the advertiser on an individual basis.

Multicast generally refers to one-to-many broadcasting or streaming. For example, the same video content having the same advertisement may be delivered to multiple end user devices within a local area network (LAN).

Unicast generally refers to one-to-one broadcasting or streaming. For example, unicast is typically used in OTT streaming applications, such as Netflix™, where a video stream is prepared and delivered to a specific end user device. In the case of unicast, individual data can be collected about each viewer, based on data available from the device used to stream the video content. When large amounts of data need to be transmitted in real time in an unicast manner, content delivery networks (CDNs) are usually used for easier distribution of said data over the internet.

Unicast enables targeted advertising, where advertisements can be personalized and delivered to viewers of a specific user device, such as a CTV device. The personalization may be enabled by data that can be legally collected from the user device used to stream video content under OTT, including for example, cookies, device identifiers, IP address, region, area code, recent browsing history, recent streaming history, ratings, advertisement click rate, and so on. However, because of the highly personalized advertisement delivery, a viewer of an advertisement, who is a potential customer, may see the same advertisement too many times in a short span of time. At some point, the potential customer may become resistant to the advertised brand due to the same advertisement being shown repeatedly within a short amount of time.

Furthermore, for large-scale transmission and delivery of video content, unicast may become less efficient, as it requires a significant amount of data packets to be duplicated and transmitted for each recipient. This outcome (a mixture of broadcast, multicast and unicast ads in a viewer's experience) is typically handled by using a mix of traditional traffic and playout solutions, with regional variations handled by regional bookings and different transport streams, with the unicast addressable substitution performed using 'one-time' manifest manipulation by traditional SSAI or CSAI implementations.

In an aspect, there is provided a computer-implemented video processing system for advertisement processing and delivery, enabling real time delivery of ad impressions dynamically inserted into the video content. Instead of relying on broadcast traffic, scheduling and playout/distribution infrastructure (or an over-worked and expensive unicast server making many duplicate responses) to perform regional or local variation, in some example embodiments described herein, the system achieves the same end goal by using a single transport stream (the 'broadcast feed'), followed by multiple manifest manipulations performed in serial.

For example, a first manifest manipulation includes a pass made to manipulate in the multicast spots on a limited number of manifests (equal to the number of cohorts) and then a subsequent manifest manipulation includes a pass made at the individual unicast manifests (equal to the number of viewers).

Embodiments described herein utilize both multicast video processing and unicast video processing techniques to deliver greater efficiency, such that less computing resources are spent on serving ads with video delivery, at the same time achieving an optimum result, as defined by metrics relating to how effective the served ads are.

In some embodiments, measurement data such as individual metrics, audience demographics, device information, and historical viewing data can be analyzed to generate an intelligent output on when to serve or insert an ad, and to whom. The intelligent output may be generated based on a number of predefined conditions, such as, for example, a minimum and/or maximum value for number of ads per customer per time period (e.g., per day). The minimum or maximum value may be defined in relation to ads for a given brand or a given category of products (e.g., for device A, no more than five skincare advertisements per day).

In some embodiments, a more nuanced condition may be a cadence at which a viewer has seen the same ad. The cadence measures, in a predefined period of time, how often the same ad has been displayed on the same device, on one or more different applications. For instance, in an unicast environment, when measurement data indicates a user of the device may be interested in a specific pair of shows from a brand, an advertisement catering to the interest may be displayed the first time at 11 AM to the user within a post on a social networking platform, the second time at noon to the user again in a banner in his or her e-mail browsing application, and the third time at 1 PM as an inserted ad in a video stream on YouTube™ on the same device. The cadence of this ad to the same viewer in this example indicates that the viewer might be turned away from the product or the brand, even if he or she was initially interested in purchasing, after the advertisement has been displayed too many times in a short amount of time.

In some embodiments, by analyzing and utilizing granular data gathered from each CTV device, a video processing system including a video ad server can effectively prevent the same advertisement from appearing too often to the same user on the same device, thereby avoiding the above example of a potential customer being turned away due to the ad cadence problem. At the same time, the advertiser has saved money by not paying for too many advertisements displayed to the same viewer in a short amount of time.

For example, in some embodiments, an example system is implemented to execute a two-step processing of the broadcast manifest, whereby ads served in a multicast manner (same ad to many viewers) are only processed once and charged for once per cohort. An ad cohort is a group of people sharing similar characteristics or metrics, and are targeted with specific advertising campaigns. This is a significant cost saving to the advertiser, and also a significant improvement of computing resource efficiency, as a vast amount of computing power is no longer wasted on delivering ineffective advertisements.

In a foreseeable future state of the industry, where most or all consumed TV video is on OTT/CTV addressable platforms, embodiments described herein enable 'mass reach' spots to advertisers who want the whole audience or large cohorts therein, while doing so at a relatively low budget.

Secondly, as viewers are able to 'opt out' of addressable targeted advertising under an unicast advertisement framework, embodiments herein implement a unique multicast advertising process to serve ads to opted-out cohorts, allowing the advertisers to retain the ability to engage potential customers under a multicast framework.

FIG. 1 illustrates a block diagram of an example video advertisement processing system 100 in accordance with some embodiments, which can be referred to as system or platform 100. The system 100 is configured to perform two different types of manifest manipulations in order to generate and deliver video content with efficient and effective advertisement content to end devices 290 over a network 118.

The system 100 can include one or more I/O units 102, processors 104, communication interfaces 106, and data storage 110. A processor 104 can execute instructions in memory 108 to implement aspects of processes described herein. Data storage 110 may include databases 112 and persistent storage 114, and configured to store machine-readable instructions and data sets associated with the video processing units. Databases and/or persistent storage may be provided using various types of storage technologies, such as solid state drives, hard disk drives, flash memory, and may be stored in various formats, such as relational databases, non-relational databases, flat files, spreadsheets, extended markup files, etc.

The one or more processors 104 can execute instructions in memory 108 to configure traffic engine 220, playout engine 230, optimization engine 250, multicast video processing unit 260, multicast manifest manipulation unit 265, unicast video processing unit 270, unicast manifest manipulation unit 275, video ad server 280 and other functions, which are described next with reference to FIG. 2.

In some embodiments, one or more of traffic engine 220, playout engine 230, optimization engine 250, multicast video processing unit 260, multicast manifest manipulation unit 265, unicast video processing unit 270, and unicast manifest manipulation unit 275 may be implemented as part of video ad server (ADS) 280.

Figure 2:
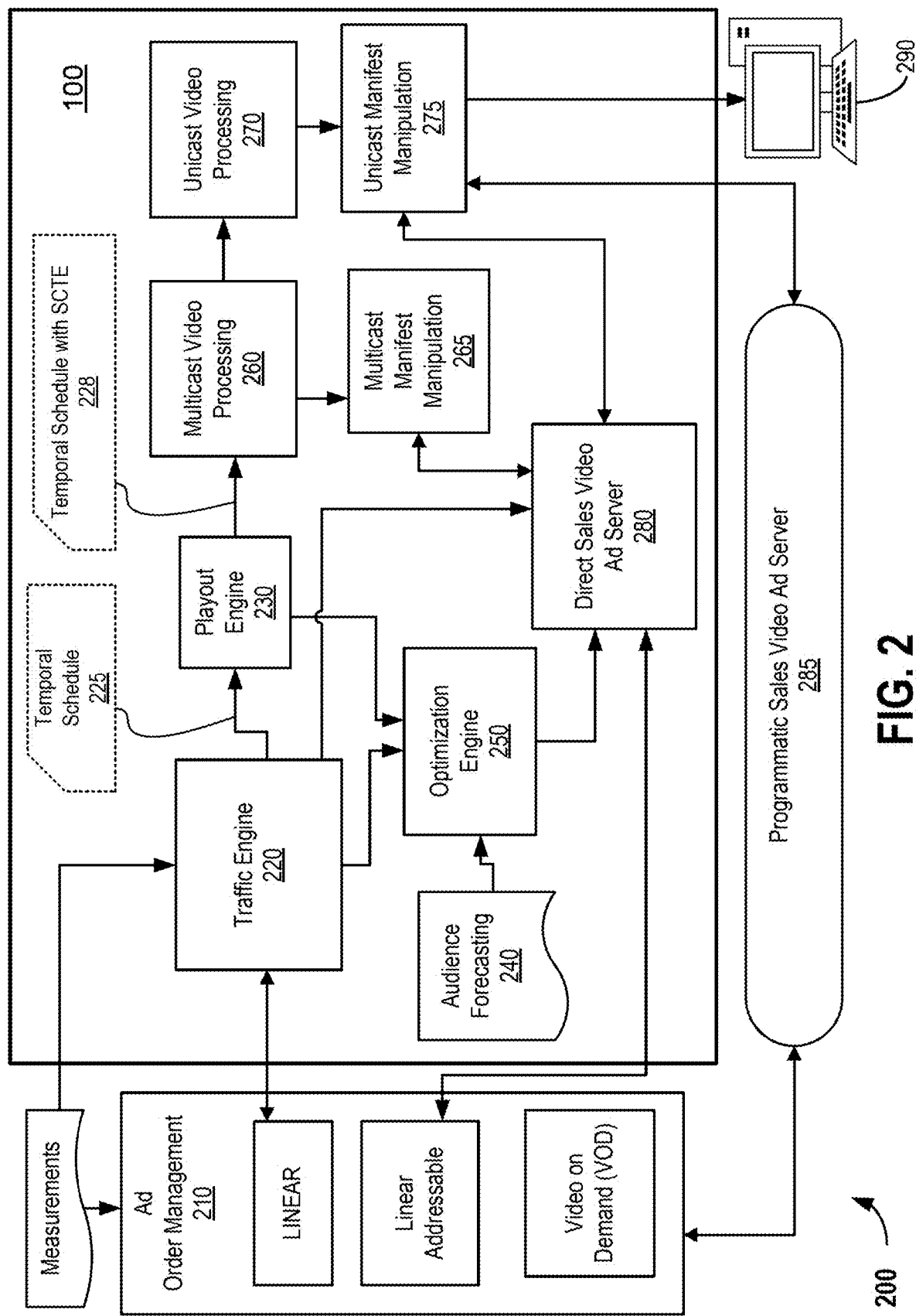
FIG. 2 is an example schematic diagram illustrating a video advertisement server environment in which the system in FIG. 1 is implemented, in accordance with one embodiment.

FIG. 2 is an example schematic diagram illustrating a video advertisement server environment 200 in which the system 100 in FIG. 1 is implemented, in accordance with one embodiment. The system 100, in some embodiments, is implemented to execute linear control and addressable decisions of advertisement placements in real time for a video stream to be delivered to one or more addressable platforms, by execution of a traffic engine 220, an optimization engine 250, a playout engine 230, multicast video processing unit 260, multicast manifest manipulation unit 265, unicast video processing unit 270, and unicast manifest manipulation unit 275, in conjunction with direct sales ADS 280. An addressable platform may refer to a digital platform that provides a specific group of individuals sharing a defined set of characteristics or criteria that makes the group a target cohort for an ad campaign.

An order management system 210 is an external system to manage incoming orders for advertisements, which may be specified as spot/ratings or audience/impression. Measurement data such as actual ratings of TV shows or programs may be used to process advertisement orders. Generally, advertisements may be categorized as linear, linear addressable, or video on demand (VOD). Linear advertisements refer to advertisements that are programmed or scheduled to be broadcasted to an audience at scheduled times, such as a traditional TV commercial set to air at 7 PM on TV. Linear advertisements may also be referred to as linear programmatic advertisements or linear control advertisements throughout the disclosure. The abbreviation "ad" is a short form for "advertisement" throughout the disclosure.

Linear addressable advertisements refer to advertisements that cater to individual audiences, based on available measurement data and signals, such that the advertisement contains a more relevant message to the individual audience. Linear addressable advertisements may be personalized based on real time or near real time data signals from the device used to stream the video content delivering the advertisement. Such data signals may include data representing user preferences, past behaviours and demographics, as non-limiting examples.

VOD advertisements refer to advertisements placed within video programs or clips, such as advertisements shown at the beginning of a free video shown on YouTube™.

Linear advertisement orders may be sent to the traffic engine 220, which may in turn generate a temporal schedule 225. The temporal schedule 225 may facilitate dynamic creation of streams with alternate content that may be targeted to a subset of distribution, as well as signaling the insertion of metadata, such as the location of program and advertisement boundaries, into the production stream.

A temporal schedule 225 may include a playlist (also referred to as a schedule) for a video channel, including primary audio/video events, interstitial breaks, and secondary events. The temporal schedule 225 may include signals indicating a specific position in the playlist or schedule, which is available for advertising to be inserted. The traffic engine 220 includes a sub-system for planning placement of advertisements in the linear stream of origination. The traffic engine 220 is also used to indicate which placement opportunities can be used for linear addressable placements.

A temporal schedule can include timing references used to direct when certain events, ads, fragments or other portions of a video are located temporally in a stream (e.g., to delay an ad by 2 seconds). In some embodiments, timing references are implemented to enable the manipulation of time in order to meet the output (delivery) requirements. Content can be delivered by reference either through a dependent proxy file, or through description in a playlist or manifest. When content is delivered by reference, the system can request for the content from a remote server at that reference before it receives the actual content. Content can be delivered by any number of protocols such as ftp, http, or other protocol in a timing manner where the result is indistinguishable from live. Content can be delivered by any number of protocols such as ftp, http, or other protocols in a manner that emulates a file delivery. Content can be provided as encrypted or unencrypted.

The playout engine 230 receives the temporal schedule 225 and generates an updated temporal schedule 228 with one or more data markers. A data marker can include a data signal used to identify a splice point or position, such as a temporal point, in a transport stream, for placement of additional content. For instance, a data marker can indicate a position for an advertisement placement or insertion, a program boundary, credits, chapters, blackouts, and so on. Data markers can be converted into metadata embedded within a broadcast manifest associated with the transport stream.

In some embodiments, data marker signals are used for inserting advertisements into a video stream, such as a transport stream. Each data marker signal indicates a splice point for regional or individually targeted dynamic ad insertion. A data marker can be delivered in-band, embedded or interleaved with audio and video signals. For example, a data marker can include at time-based signal which indicates a start time of advertisement placement, and optionally may include a duration for the advertisement placement.

The data marker signals can be, as an non-limiting example, Digital Program Insertion Cueing Message for Cable (SCTE) 35 marker signals.

A multicast video processing (and packaging) unit 260 may be configured to convert the video output of the playout engine 230 to a transport stream with the SCTE-35 markers.

The multicast video processing (and packaging) unit 260 may include one or more encoders or transcoders used to convert a source content into a format suitable for dynamic video delivery. The one or more encoders or transcoders may be used to insert ads, text and graphic overlays into the video stream, when their content and timing is known in advance, or just-in-time when the overlays are known at the playout time. The insertion based on manifests/playlists can be received from the playlist and subsequent (downstream) substitutions happen in manifests. Lastly, the transcoder may also insert metadata into the video stream, such as captioning or other program data. Any manipulation of timing such as the synchronization of closed captioning to video content or the expansion of content length may also be handled within the multicast video processing (and packaging) unit 260.

Next, the output of the multicast video processing (and packaging) unit 260 is sent to unicast video processing (and packaging) unit 270 for further processing and packaging. The output of the unicast video processing (and packaging) unit 270, is sent to the unicast manifest manipulation unit 275 for processing, in part based on an output from the video ad server 280, described below.

An audience forecasting file 240 is an input to optimization engine 250, which based on real time data signals concerning one or more target audiences included in the audience forecasting file 240, optimizes one or more advertisement placements within the broadcast manifest generated by the playout engine 230. The optimized broadcast manifest is then sent to the video ad server (ADS) 280 for further processing.

For example, in some embodiments, after a broadcast manifest is generated or obtained, the system 100 may execute a two-step processing of the broadcast manifest, whereby ads served in a multicast manner (the same ad to many viewers) is only processed once and charged once per cohort. An ad cohort is a group of people sharing similar characteristics or metrics, and are targeted with specific advertising campaigns. This is a significant cost saving to the advertiser, and also a significant improvement of computing resource efficiency, as a vast amount of computing power is no longer wasted on delivering ineffective advertisements.

A multicast video content generally means a video content delivered in an one-to-many manner, that is, the same video may be delivered to multiple viewing devices. A multicast ad delivery also refers to the same advertisement being delivered to multiple viewing devices.

In some cases, a roadblock advertisement may be inserted at the point of a broadcast manifest by a playout engine 230. A roadblock ad refers to an ad campaign where an advertiser books all available advertising slots on a platform for a specific period of time. The playout engine 230 may be configured to generate a broadcast manifest, whereby one or more roadblock ads are inserted by the playout engine 230.

A broadcast manifest may be, through the multicast manifest manipulation unit 265, manipulated in parallel streams, where each broadcast stream is manipulated in parallel, and there are as many parallel streams as there is granularity in the roadblock ad bookings. For instance, if regional roadblocks are inserted in the broadcast manifest, the video ad server 280 is called once per region to stitch in or insert one or more linear advertisements, before the feed is sent to the unicast manifest manipulation unit 275.

In some embodiments, where a user opting-in is an issue, the multicast stream can be served up to any viewer device of the user who has opted out of targeted advertisement.

Broad and filler campaigns can be used to complete the manifest around linear control advertisements or linear control roadblocks.

After having received the updated or manipulated broadcast manifest from the multicast manifest manipulation unit 265, the unicast manifest manipulation unit 275 can be executed to stitch in direct and programmatic addressable advertisements within the broadcast manifest. The programmatic addressable advertisements may be obtained from external programmatic sales ADS such as Google™ Ad Manager.

In some embodiments, a Content Distribution Network (CDN) may be engaged for distribution of the video content with the updated broadcast manifest from the unicast manifest manipulation unit 275 of system 100.

The device 290 receiving the content delivery may be a Connected TV (CTV) device, which refers to a device that is used to stream or watch video content over the internet on one or more applications or programs installed and executed within the device. This can include, for example, smart TVs, mobile devices, laptops, and game consoles. Usually, a CTV device delivers content to one or more users (audiences) on demand, in real time. CTV advertising allows companies to deliver highly relevant and engaging advertisements to the audiences. Companies are able to determine if an advertisement is effective, efficient or successful by monitoring or tracking various data signals indicating different measurements, such as, for example, video completion rate, automatic content recognition, and other metadata offered by cookies on the device.

In some embodiments, the multicast manifest manipulation unit 265 can include an insertion component that populates the transport stream from the multicast video processing (and packaging) unit 260 with broadcast ads based on the temporal schedule 228. The temporal schedule 228 may include one or more data markers indicating specific positions for potential advertisements.

The insertion component within the multicast manifest manipulation unit 265 may populate the transport stream with broadcast ads optimized to include advertisements from optimization engine 250, for delivery to one or more CTV units. The advertisements from optimization engine 250 may include one or more linear advertisements, also referred to as linear control advertisements, which include advertisements that are displayed to viewers or groups of viewers In some embodiments, the unicast manifest manipulation unit 275 may be implemented to populate the transport stream with broadcast ads, which for example can be once for an entire channel, or once per regional zone if roadblocks are geo targeted.

The ADS 280 may include a server that responds in real-time to queries from the multicast manifest manipulation unit 265 and the unicast manifest manipulation unit 275 about which ad copy is to be displayed to one or more users in a linear addressable placement opportunity in a video transport stream.

In some example embodiments, the ad order management unit 210 is implemented to sell ad inventory to a specific audience, resulting in a list of orders that must be fulfilled. The linear ad orders are sent to the traffic engine 220 for execution.

In some example embodiments, linear addressable ad orders are sent to the ADS 280. Audience forecasts 240 are sent to optimization engine 250. Impression orders can be sent by the traffic engine 220 to optimization engine 250, which can return optimized ads to the traffic engine 220 for placement.

In some example embodiments, an ad copy is transferred to and prepared for the appropriate playout servers in the playout engine 230.

In some example embodiments, the temporal schedule file 225 is generated for a video channel. The temporal schedule 225 includes signal data indicating a start time and an end time for all programs, as well as one or more break structures. Placement opportunities are identified in the break structures.

In some example embodiments, the traffic engine 220 receives instructions, data, and parameters from ad order management system 210 (e.g., campaign planning system) about ad orders for fulfillment. The traffic engine 220 implements and executes a multi-pass method to match ad orders with available placement opportunities in the temporal schedule. Traffic decisions can be made based on: spot placement, which means an ad order is for a specific time or specific individual placement opportunity; and target audience, which means an order is matched to a placement opportunity because the audience corresponds to a quantity or quality of the audience that was ordered, resulting in improved efficiency in advertisements.

In some example embodiments, the traffic engine 220 also tags specific playout opportunities as being available for addressable ads. For instance, the traffic engine 220 can generate a video configuration log file, which is passed to the playout engine 230 for execution. Any time a placement opportunity in the log file is marked as "addressable", the playout engine 230 can insert a SCTE marker into the stream.

An addressable ad placement opportunity facilitates delivery of relevant messages to desired audiences based on available signals, regardless of presence of ad identifiers such as third-party cookies. This approach is key to reaching and gauging the effectiveness of online ad spaces, and in driving engagement and ad relevance.

In response to the SCTE-35 markers in the transport stream, in some example embodiments, the multicast manifest manipulation unit 265 can generate and transmit an ad request to the ADS 280. This component is called only x number of times, where x represents the number of target aggregate audience groups, to substantially reduce the ad serving costs.

An ad request can include, for example, a specification file in an XML template used to describe a structure for ad inventory insertion, to be executed by a video player or a content distribution system.

For instance, as non-limiting example, the ad request can include an IAB Video Ad Serving Template (VAST) or Video Multiple Ad Playlist (VMAP) ad request. The response from ADS 280 is placed into the broadcast manifest.

In response to the SCTE-35 markers in the transport stream, in some example embodiments, the unicast manifest manipulation unit 275 can generate and transmit an ad request signal to the ADS 280. The response from the ADS 280 can be included into the broadcast manifest.

The end user device 290 may display the transport stream from the unicast manifest manipulation unit 275 with direct-sold targeted ads from ADS 280 and linear control advertisements from optimization engine 250.

Figure 3:
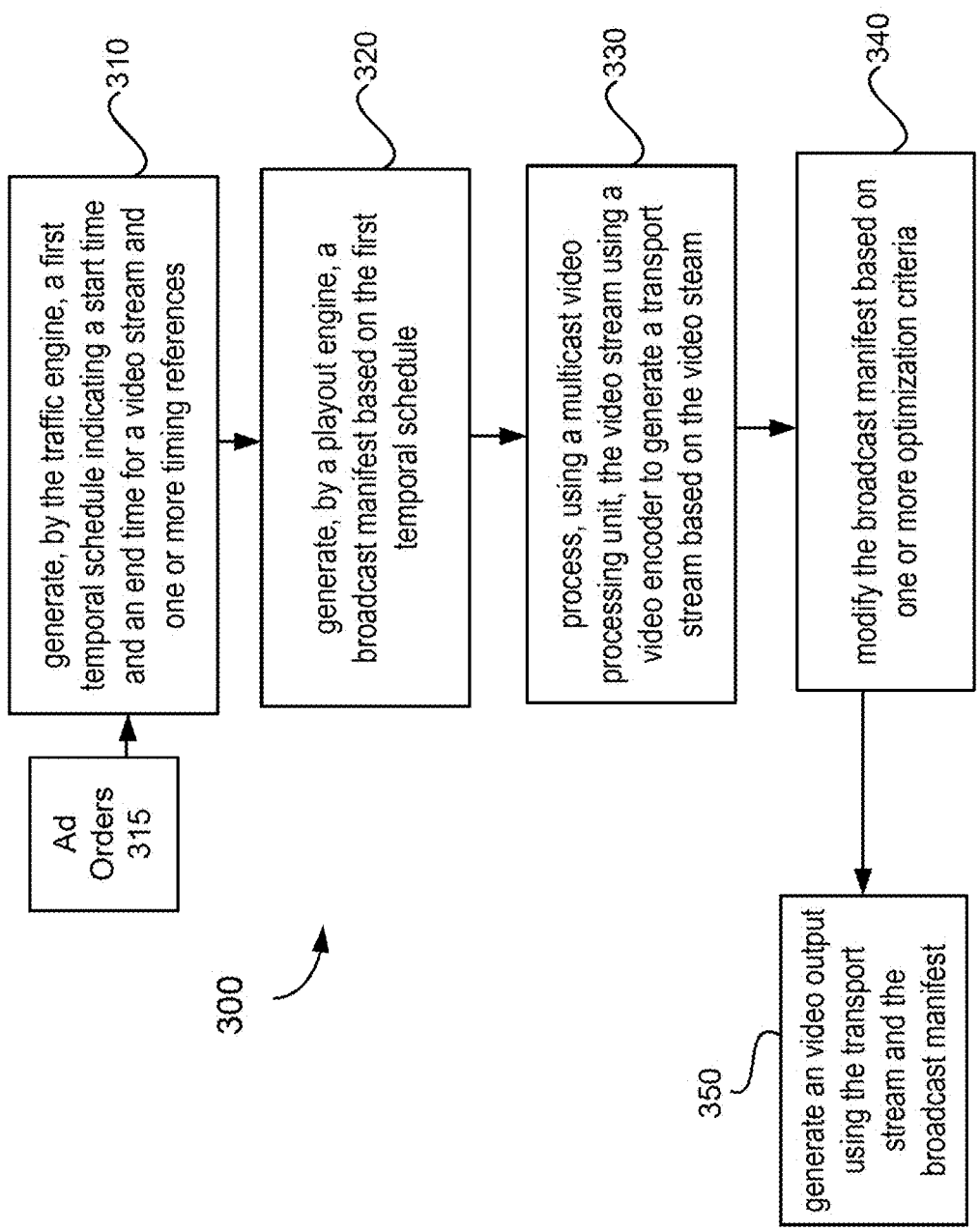
FIG. 3 illustrates an example process performed by the system in FIG. 1 to perform video advertisement processing and delivery in accordance with one embodiment.

FIG. 3 illustrates an example process 300 performed by the system in FIG. 1 to perform video advertisement processing and delivery.

At operation 310, the system 100 may receive or obtain advertisement orders 315, and generate, by a traffic engine 220, a first temporal schedule 225 indicating a start time and an end time for a video stream and one or more timing references, each of the timing references indicating a respective position in the video stream for advertisement placement.

At operation 320, the system 100 may generate, by a playout engine 230, a broadcast manifest based on the first temporal schedule 225.

At operation 330, the system 100 may process, using a multicast video processing unit 260, the video stream using a video encoder to generate a transport stream based on the video stream, the transport stream comprising one or more data markers for placements of one or more advertisements.

In some embodiments, the one or more data markers comprise Digital Program Insertion Cueing Message for Cable (SCTE) 35 markers.

In some embodiments, in response to the one or more data markers, the method includes updating the broadcast manifest to include one or more advertisement placements within the video output feed.

At operation 340, the system 100 may modify the broadcast manifest based on one or more optimization criteria.

In some embodiments, the method includes using a multicast manifest manipulation unit 265 to update the broadcast manifest.

In some embodiments, the method includes using a unicast manifest manipulation unit 275 to update the broadcast manifest.

In some embodiments, the broadcast manifest is associated with the temporal schedule.

In some embodiments, the multicast manifest manipulation unit 265 is configured to populate the transport stream with one or more advertisements based on the temporal schedule.

In some embodiments, the multicast manifest manipulation unit 265 is configured to populate the transport stream with one or more advertisements optimized to include one or more advertisements from an optimization engine 250. The one or more advertisements may include linear control advertisements.

At operation 350, the system 100 may generate a video output feed using the transport stream and the broadcast manifest.

The temporal schedule may include a data file, which may include, for example, data representing a temporal schedule that includes timing references used to direct when certain events, ads, fragments or other portions of a video are located temporally in a stream (e.g., to delay an ad by 2 seconds). In some embodiments, timing references are implemented to enable the manipulation of time in order to meet the output (delivery) requirements. Content can be delivered by reference either through a dependent proxy file, or through description in a playlist or manifest. When content is delivered by reference, the system can request for the content from a remote server at that reference before it receives the actual content. Content can be delivered by any number of protocols such as ftp, http, or other protocol in a timing manner where the result is indistinguishable from live. Content can be delivered by any number of protocols such as ftp, http, or other protocols in a manner that emulates a file delivery. Content can be provided as encrypted or unencrypted.

Figure 4:
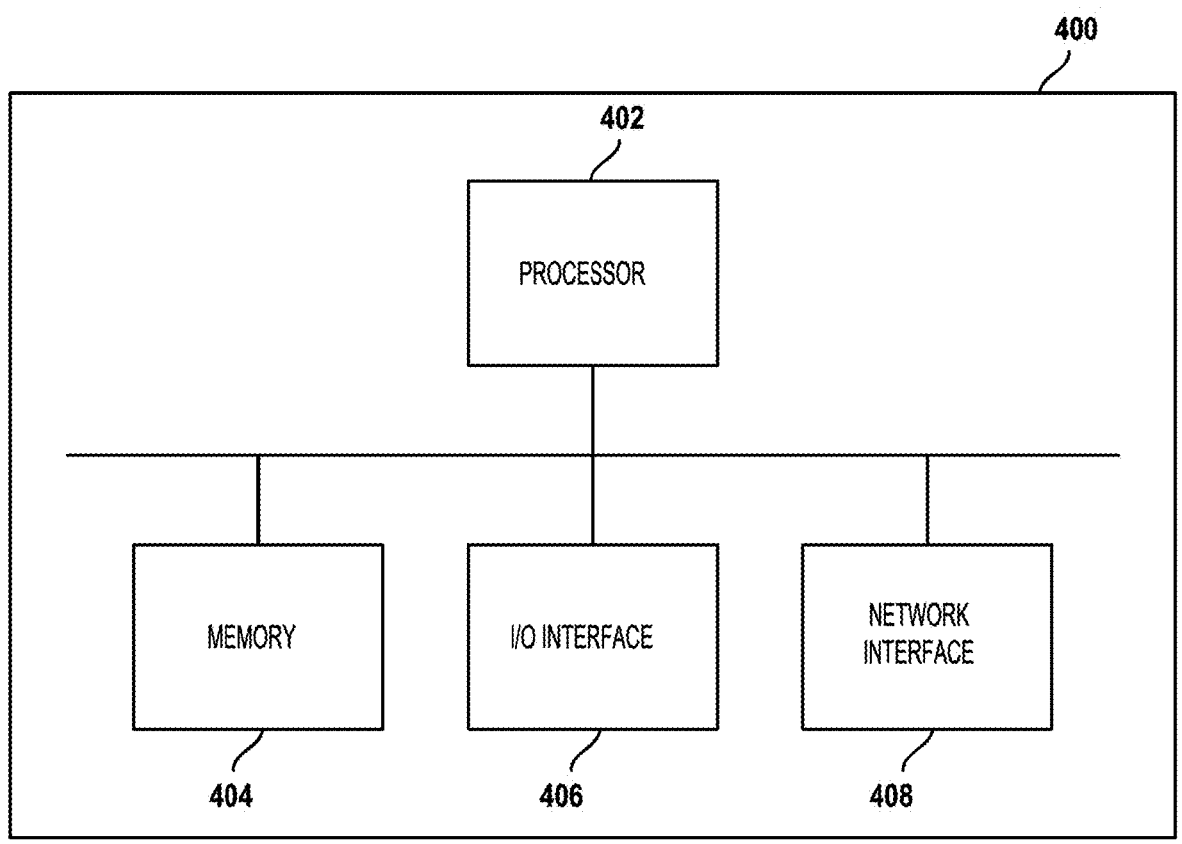
FIG. 4 is a schematic diagram of a computer system that may be used to implement the system in FIG. 1, in accordance with one embodiment.

Referring now to FIG. 4, which shows a computer system 400 that is specifically configured and implemented to execute and operate an example video processing system 100 in accordance with some embodiments.

A processing device 402 can execute instructions in memory 404 to configure various system units as shown in FIGS. 2 and 3. A processing device 402 can be, for example, a type of microprocessor or microcontroller, a digital signal processing (DSP) processor, an integrated circuit, a field programmable gate array (FPGA), a reconfigurable processor, or a combination thereof.

Each I/O unit 406 enables the system to interconnect with one or more input devices, such as a keyboard, mouse, camera, touch screen and a microphone, or with one or more output devices such as a display screen and a speaker.

Each communication interface 408 enables the system 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Memory 404 may include storage that may be configured to store information associated with the video processing units. Storage and/or persistent storage may be provided using various types of storage technologies, such as solid state drives, hard disk drives, flash memory, and may be stored in various formats, such as relational databases, non-relational databases, flat files, spreadsheets, extended markup files, etc.

Present disclosure provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

The invention claimed is:

1. A computer-processor-implemented system for advertisement processing and delivery, comprising:
   a processor; and
   a non-transitory data storage device storing a set of instructions, when executed by the processor, causes the system to:
      obtain, by a traffic engine, one or more advertisement (ad) orders;
      generate, by the traffic engine, a first temporal schedule indicating a start time and an end time for a video stream and one or more timing references, each of the timing references indicating a respective temporal position in the video stream for advertisement placement;
      generate, by a playout engine, a broadcast manifest based on the first temporal schedule;
      process, using a multicast video processing unit, the video stream using a video encoder to generate a transport stream based on the video stream, the transport stream comprising one or more data markers for placements of one or more advertisements, wherein each of the data markers include a data signal used to identify a temporal splice point in the transport stream for placement of additional content, wherein the transport stream is populated with the one or more advertisements once for each target aggregate audience group of a plurality of target aggregate audience groups, wherein the video encoder further enables manipulation of the transport stream for synchronization of captioning and expansion of transport stream length to meet video output feed requirements;
      modify the broadcast manifest based on one or more optimization criteria; and
      generate a video output feed using the transport stream and the broadcast manifest.

2. The system of claim 1, wherein the one or more data markers comprise Digital Program Insertion Cueing Message for Cable (SCTE) 35 markers.

3. The system of claim 1, wherein in response to the one or more data markers, the broadcast manifest is updated to include one or more advertisement placements within the video output feed.

4. The system of claim 3, further comprising a multicast manifest manipulation unit to update the broadcast manifest.

5. The system of claim 3, further comprising a unicast manifest manipulation unit to update the broadcast manifest.

6. The system of claim 3, wherein the broadcast manifest is associated with the temporal schedule.

7. The system of claim 4, wherein the multicast manifest manipulation unit is configured to populate the transport stream with one or more advertisements based on the temporal schedule.

8. The system of claim 4, wherein the multicast manifest manipulation unit is configured to populate the transport stream with one or more advertisements optimized by an optimization engine.

9. The system of claim 8, wherein the optimization engine is configured to optimize one or more placements of the one or more advertisements based on the broadcast manifest.

10. The system of claim 9, wherein the one or more advertisements comprise one or more linear control advertisements.

11. A computer-process-implemented method for serving advertisements in a video stream, the method comprising:
   obtaining, by a traffic engine, one or more advertisement (ad) orders;
   generating, by the traffic engine, a first temporal schedule indicating a start time and an end time for a video stream and one or more timing references, each of the timing references indicating a respective temporal position in the video stream for advertisement placement;
   generating, by a playout engine, a broadcast manifest based on the first temporal schedule;
   processing, using a multicast video processing unit, the video stream using a video encoder to generate a transport stream based on the video stream, the transport stream comprising one or more data markers for placements of one or more advertisements, wherein each of the data markers include a data signal used to identify a temporal splice point in the transport stream for placement of additional content, wherein the transport stream is populated with the one or more advertisements once for each target aggregate audience group of a plurality of target aggregate audience groups, wherein the video encoder further enables manipulation of the transport stream for synchronization of captioning and expansion of transport stream length to meet video output feed requirements;
   modifying the broadcast manifest based on one or more optimization criteria; and
   generating a video output feed using the transport stream and the broadcast manifest.

12. The method of claim 11, wherein the one or more data markers comprise Digital Program Insertion Cueing Message for Cable (SCTE) 35 markers.

13. The method of claim 11, further comprising, in response to the one or more data markers, updating the broadcast manifest to include one or more advertisement placements within the video output feed.

14. The method of claim 13, further comprising using a multicast manifest manipulation unit to update the broadcast manifest.

15. The method of claim 13, further comprising using a unicast manifest manipulation unit to update the broadcast manifest.

16. The method of claim 13, wherein the broadcast manifest is associated with the temporal schedule.

17. The method of claim 14, wherein the multicast manifest manipulation unit is configured to populate the transport stream with one or more advertisements based on the temporal schedule.

18. The method of claim 14, wherein the multicast manifest manipulation unit is configured to populate the transport stream with one or more advertisements optimized to include one or more linear control advertisements from an optimization engine.

19. The method of claim 18, wherein the optimization engine is configured to optimize one or more placements of the one or more advertisements based on the broadcast manifest.

20. The method of claim 19, wherein the one or more advertisements comprise one or more linear control advertisements.

* * * * *